March 16, 1965  L. PÉRAS  3,173,707
MOUNTING OF WHEEL SUSPENSION ARMS
Filed March 15, 1962  2 Sheets-Sheet 1
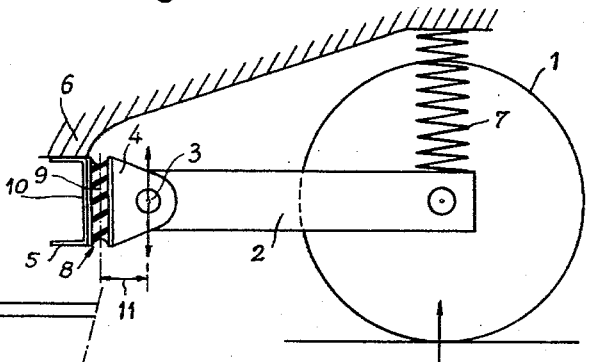
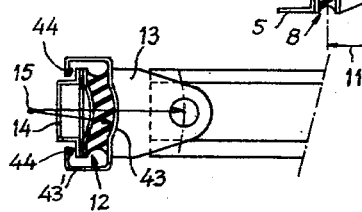
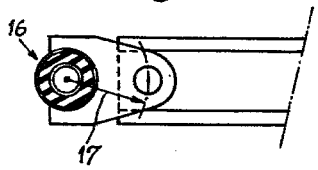
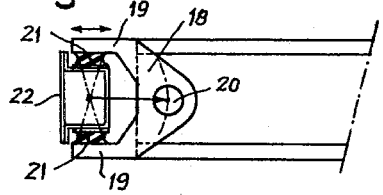
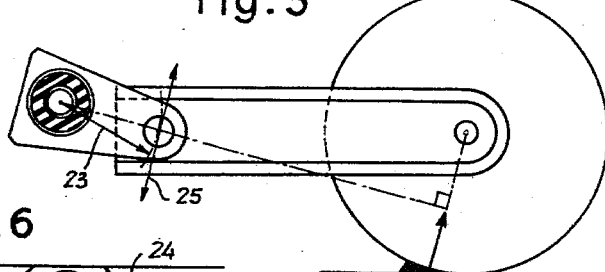
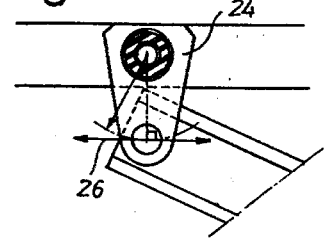
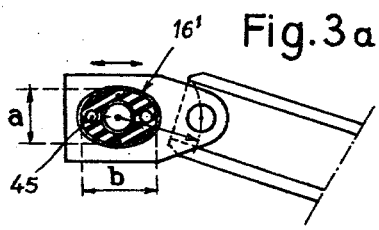
Inventor
Lucien Péras
By Stevens, Davis, Miller & Mosher
Attorneys March 16, 1965  L. PÉRAS  3,173,707
MOUNTING OF WHEEL SUSPENSION ARMS
Filed March 15, 1962  2 Sheets-Sheet 2
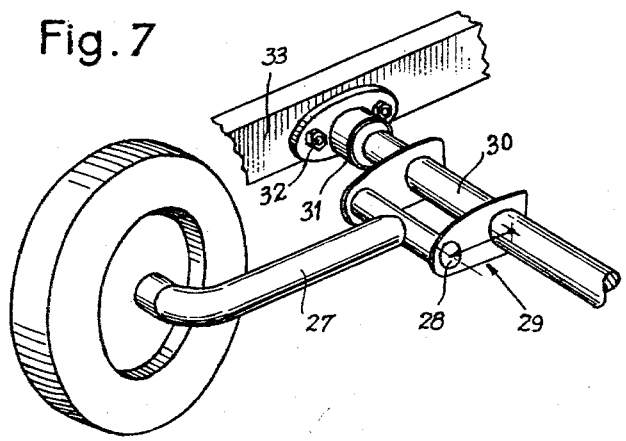
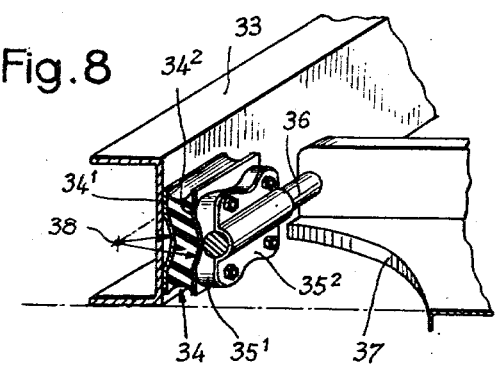
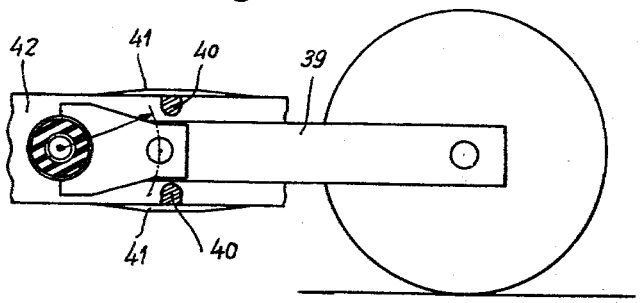
Inventor
Lucien Péras
By Stevens, Davis, Miller & Mosher
Attorneys

# United States Patent Office 3,173,707
Patented Mar. 16, 1965

3,173,707
MOUNTING OF WHEEL SUSPENSION ARMS
Lucien Péras, Billancourt, France, assignor to Regie Nationale des Usines Renault, Billancourt, France
Filed Mar. 15, 1962, Ser. No. 179,932
Claims priority, application France, Mar. 22, 1961, 856,487, Patent 1,292,334
5 Claims. (Cl. 280—124)

This invention relates to wheel suspension systems of vehicles, of the type comprising a swinging or carrier arm.

Technological requirements frequently prevent the adoption of wheel swinging arms so designed that the axis of their pivotal mounting on the frame be coincident with the centre of percussion of the arm, and it is notably current practice to connect the wheel arm to the frame through the medium of a support secured on the frame and constituting a pivot bearing for this arm.

This arrangement is detrimental in that it transmits to the frame on the one hand the shocks received by the wheel as it rolls on paving stones, on the expansion joints of certain road surfaces, or on other road unevennesses.

It is the object of this invention to provide an improved wheel arm mounting characterized in that the aforesaid support is connected to the frame through the intermediary of at least one block of resilient material, the flexibility of this block controlling the stress transmitted from this support as a consequence of the wheel shocks so as to "filter" them with respect to the frame.

With this arrangement it is possible to take advantage of the rocking moment applied to this support for causing said block to operate with a flexibility consistent with the desired result.

Various forms of embodiment of a wheel suspension arm mounting will be described hereafter with reference to the attached drawings in which:

FIGURE 1 is a diagrammatic side elevational view showing a wheel suspension system comprising a longitudinal swinging or carrier arm;

FIGURES 2, 3, 3a and 4 are fragmentary views showing alternate embodiments of the resilient mounting of the wheel arm;

FIGURES 5 and 6 illustrate two specific mountings of the longitudinal wheel arm;

FIGURE 7 is a perspective view showing the mounting of a rear axle wheel mounting;

FIGURE 8 is another perspective view showing the mounting of a conventional triangular front suspension system, the assembly being sectioned across the middle of its pivot pin, and FIGURE 9 is a diagrammatic side elevational view showing an alternate mounting of a longitudinal wheel carrier arm.

It is noted that in the drawings the resilient blocks, when not shown in section, are designated by heavy diagonal section lined surfaces in order to make them clearly apparent.

In the wheel suspension system illustrated in FIG. 1 the wheel 1 is mounted according to the conventional arrangement on the free end of a so-called longitudinal swinging arm of which the other end is pivoted at 3 on a supporting strap 4 connected to a cross member 5 solid with the body 6 of the vehicle. The suspension spring is shown only diagrammatically at 7.

According to this invention the strap 4 is connected to the cross member 5 through the medium of a block 8 of resilient material. This block 8 comprises in this example a flat shoe 9 of rubber, disposed vertically and adhering with one face on the base of strap 4 and with the other face on a metal plate 10 secured on the cross member 5. This block may comprise if desired a mounting metal plate on either face, the way in which this block is mounted being of course a matter of choice.

With this resilient block arrangement the wheel shocks are efficiently "filtered" with respect to the frame or body of the vehicle, the flexibility of this block absorbing or controlling the resulting rocking moment of the strap and operating notably as a function of the distance 11 from the axis of pivot pin 3 to the centre of this block. With this vertical position of the block, the absorption of vertical beats is particularly efficient.

In the alternate embodiment illustrated in FIG. 2 the resilient block 12 is curved, the base of the strap 13 on which the wheel suspension arm is pivoted being connected to the convex face of the block, the other or concave face of this block adhering on a box-sectioned cross member 14 of the frame. With this arrangement the rocking movements of the strap are caused to take place substantially about the centre of curvature 15 of the resilient block 12.

FIG. 3 illustrates an embodiment wherein the resilient block 16 consists of a cylindrical sleeve adhering to a pair of concentric internal and external sockets. The wheel arm mounting strap 17 is shaped to fit about more than half the block 16, this strap being rigid with the outer socket of the block while the inner socket is rigid with a fixed pin (not shown) connected to the frame. In this example the axis about which the strap is caused to rock during the wheel beats is coincident with the centre of the resilient sleeve.

An alternate embodiment illustrated in FIG. 3a comprises a resilient block $16^1$ having a circular inner contour and an oval, for example elliptic, outer contour, this block adhering to a pair of sockets of corresponding configuration, whereby the elasticity of the block in the direction of the larger diameter $b$ is greater than in the direction of the smaller diameter $a$. With this arrangement it is possible to complete the torsional elasticity of the block with different transverse elasticities according to the directions contemplated. Moreover, the elasticity of the block may be increased in the direction of the larger diameter $b$ by forming longitudinal holes such as 45 through the resilient sleeve.

In the alternate embodiment illustrated in FIG. 4 the wheel arm mounting strap 18 is provided for assembly purposes with a fork-like pair of opposite arms 19 parallel to the pivot pin 20 of the wheel arm. The registering faces of these arms 19 are connected through flat resilient blocks 21 to the two opposite faces of a fixed central element consisting in this case of a box-sectional cross member 22 incorporated in the frame of the vehicle. Thus, the axis of the rocking movement of this strap is located approximately intermediate the two blocks 21, 21, and this arrangement is also advantageous in that it promotes the deformation of the resilient mounting in the direction perpendicular to said rocking movement, that is, in the horizontal direction in the specific case contemplated in FIG. 4.

On the other hand, according to the direction of the beat or other suspension movements of which it is desired to improve the filtering effect, the wheel arm mounting strap may be mounted in the proper angular position, as exemplified in FIGS. 5 and 6.

In these two specific examples the straps 23 and 24 are so directed that the plane intersecting the axis of the pivotal mounting of said wheel arm on said strap extends at right angles to the direction of the shocks to which a privileged "filtering" action is to be applied, that is, those directed as shown by the arrow 25 in FIG. 5 and by the arrow 26 in FIG. 6.

In the rear-axle wheel arm mounting exemplified in FIG. 7 the wheel arm 27 is pivoted at 28 on a strap 29 having its flanges rigidly mounted on a cross member 30 common to the two wheels of the train of axle considered.

This cross member 30 consists of a round-sectioned bar having either ends mounted in rubber sleeves 31 adhering to an outer metal socket secured through a flange 32 on the side face of a longitudinal member 33 of the frame. In this example the axis of the rocking movements of strap 29 which are caused by the road shocks corresponds to the centre axis of cross member 30 which, of course, is rotatably solid with the inner portion of the vibration filtering resilient block 31.

FIG. 8 is a fragmentary view showing a conventional front-wheel suspension triangle wherein a curved resilient block 34 of the type illustrated in FIG. 2 is used. This block is secured on the vertical side face of a longitudinal member 33 of the frame through the metal plate $34^1$ on the concave side of this block. On the metal plate $34^2$ corresponding to the convex face of the block, a support consisting of two elements $35^1$, $35^2$ is secured and constitutes a bearing for the pin 36 connecting each one of the two vertices (having a common pivot axis) of the suspension triangle 37, the figure showing only one of them. This assembly is pivoted about the axis 38.

With the mounting of this invention, check members for limiting the amplitude of the angular movements may be disposed in the vicinity of the pivotal mounting of the arm for supporting the maximum stress applicable to the wheel for example during the drive, a brake application or a side skidding.

FIG. 9 illustrates this arrangement in the case of a longitudinal wheel arm 39 wherein the elastic check members 40 limiting the vertical movements on either side of the arm pivot are carried by supports 41 rigid with the chassis member 42.

In the case of resilient blocks acting as shoes for securing the support, such as the flat and arcuate blocks illustrated herein, which are subjected to considerable tensile stress and to tearing stress in relation to their support, abutments may be provided for limiting the extension or stretching of these blocks. This arrangement is illustrated in FIG. 2 wherein the convex metal plate 43 of the resilient block 12 is formed with extensions $43^1$ bent over the block and extending beyond the other face thereof so as to register with the flanges of the box-sectioned cross member 14 on which the block is mounted. Elastic pads 44 adapted to engage the registering flanges of cross member 14 are carried by the inner faces of the extensions $43^1$.

Of course, outside the form of mounting of the wheel arm pivoting support according to this invention, the pivotal mounting proper of the wheel arm on said support may be obtained in different ways, with or without the use of resilient elements, without departing from the spirit and scope of the invention.

What is claimed as new is:

1. In a wheel suspension system of a vehicle, a wheel suspension arm having a free end for connection to a vehicle wheel, an arm support member disposed adjacent the other end of said arm, a pivot pin extending through said other end of the arm and said arm support member pivotally connecting said member and arm to each other, a frame, means pivotally connecting said arm support member to said frame and having a pivotal axis extending parallel to the axis of said pivot pin, said pivotal axis being spaced from said pivot pin and in a direction toward said frame, and said means including an elastic cushion member disposed between said frame and said arm support member.

2. The system of claim 1 wherein said elastic member is a sleeve configuration with a circular inner contour and oval outer contour.

3. The system of claim 2 wherein said elastic member has holes therein.

4. The system of claim 1 wherein said elastic member is a concentric sleeve.

5. Mounting in accordance with claim 1, for longitudinal suspension arms of one and the same wheel train in which the supports of the pivot pins of the arms are rigidly connected with a common transverse member and in which the said elastic member corresponding to each arm is arranged concentrically to the transverse member, the said elastic member being spaced axially on the latter.

References Cited by the Examiner

UNITED STATES PATENTS

| | | | |
|---|---|---|---|
| 2,085,591 | 6/37 | Kliesrath | 280—124 |
| 2,254,491 | 9/41 | Olley | 280—124 X |
| 2,351,651 | 6/44 | Wulff | 280—124 X |
| 2,757,917 | 7/56 | Matthias et al. | 280—124 |
| 2,885,219 | 5/59 | Paton | 280—124 |
| 2,998,240 | 8/61 | Heiss | 267—15 |
| 3,039,831 | 6/62 | Thomas | 267—20 |

FOREIGN PATENTS 780,552   8/57   Great Britain.

A. HARRY LEVY, *Primary Examiner.*

LEO FRIAGLIA, *Examiner.*